Figure 1:
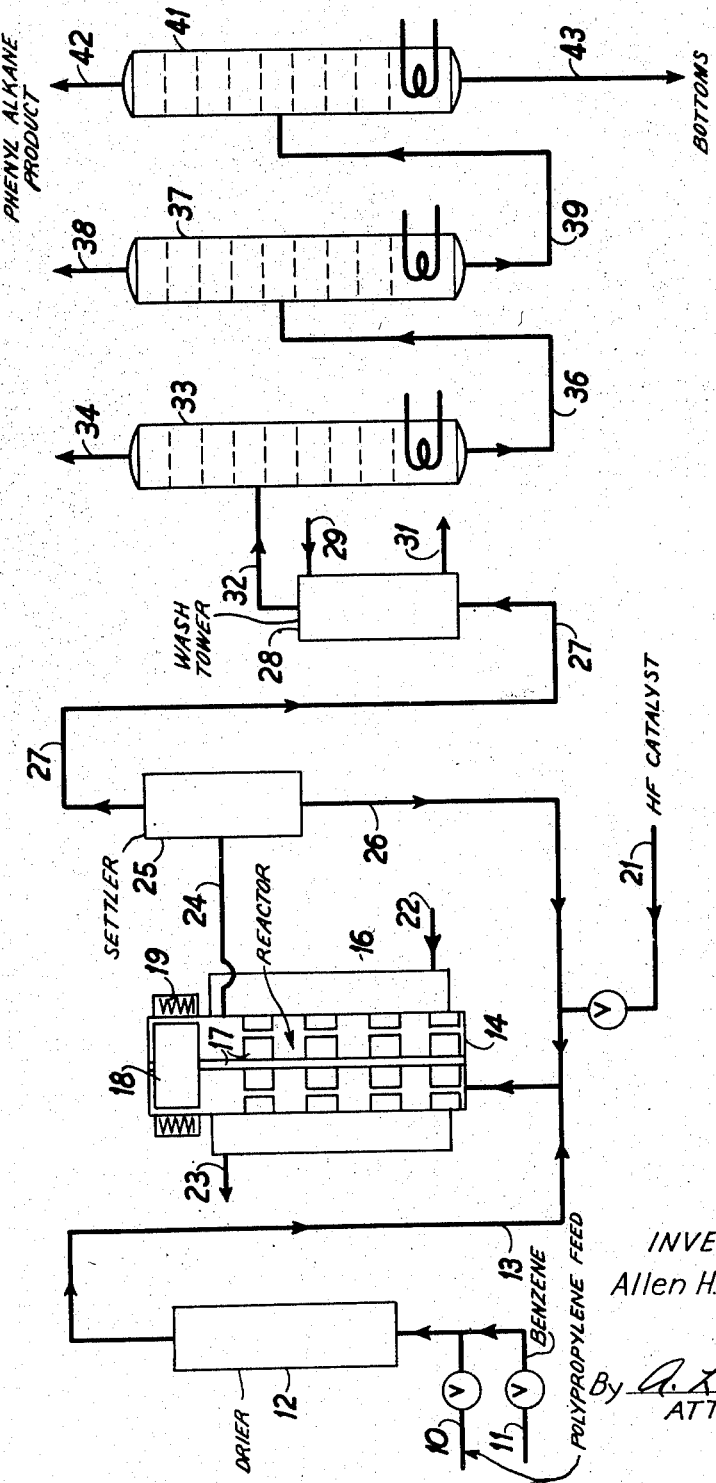
Figure 2:
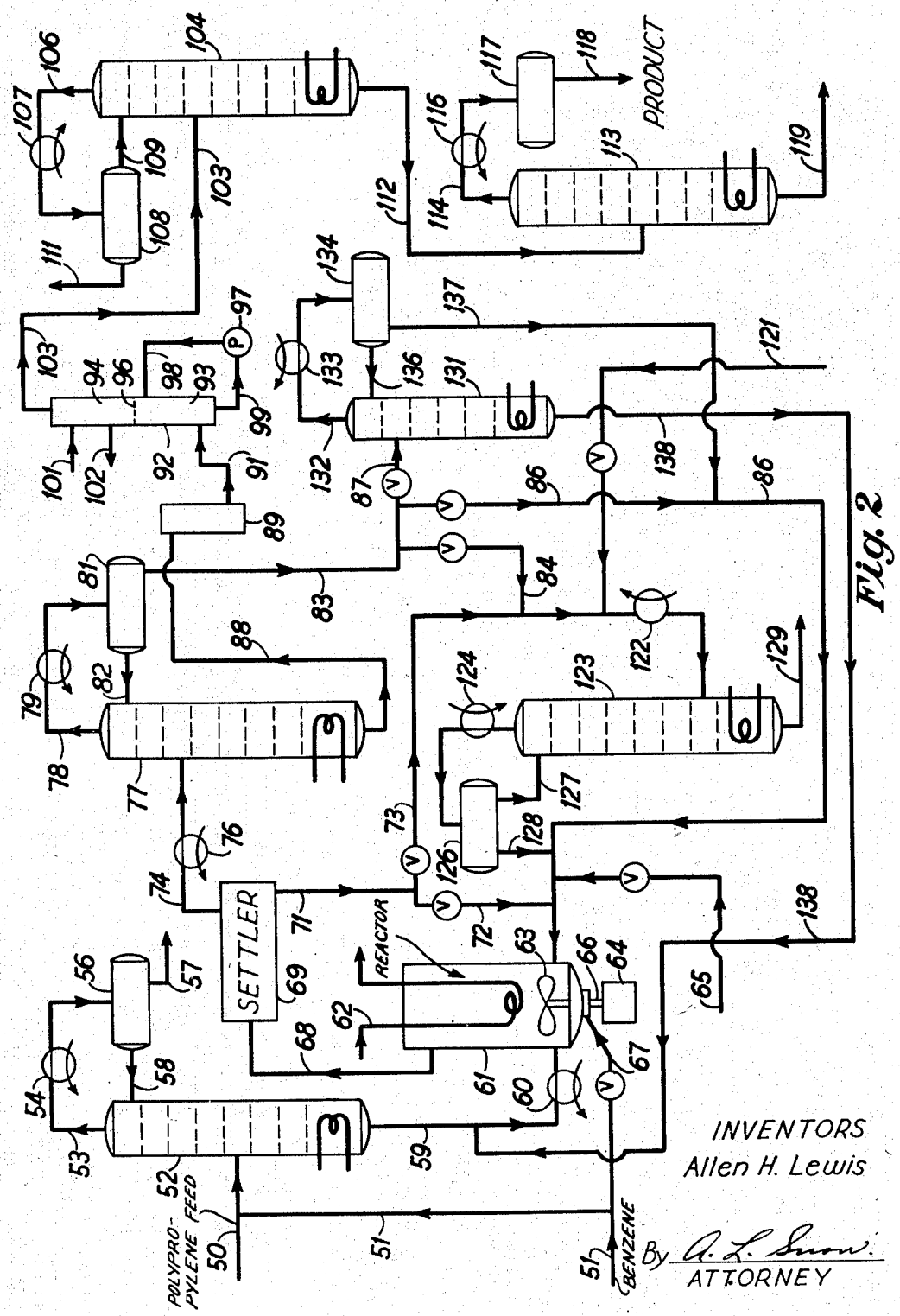

INVENTORS
Allen H. Lewis

By *A. L. Snow*
ATTORNEY

Patented July 26, 1949

2,477,382

UNITED STATES PATENT OFFICE 2,477,382

ARYL SUBSTITUTED ALKANES AND PROCESS OF MAKING THE SAME

Allen H. Lewis, Berkeley, Calif., assignor to California Research Corporation, San Francisco, Calif., a corporation of Delaware Application May 4, 1946, Serial No. 667,454

23 Claims. (Cl. 260—671)

The present invention relates to certain new aryl-substituted alkanes and to a process for preparing the same.

In the preparation of relatively long but branched-chain alkanes containing an aryl substituent (as in the condensation of an aromatic hydrocarbon such as benzene with a branched-chain alkene of nine to eighteen carbon atoms), great difficulty has been encountered because the alkene chains are broken into fragments by the condensation catalyst and the fragments condense with the aromatic nucleus to form lower aryl alkane products. These difficulties have been especially acute where the alkene structure corresponds to that obtained in polymerization of the aliphatic olefins.

The present invention involves the discovery that the foregoing difficulties can be largely overcome and branched-chain alkenes of certain structures condensed with aromatic compounds to yield novel monoaryl alkanes, or mixtures thereof, having relatively long chains, and possessing superior properties.

It also has been discovered that monoaryl alkanes, or mixtures thereof, having a novel chemical structure can be advantageously synthesized from certain branched-chain alkenes by condensation of the alkenes with an aromatic compound in the presence of a hydrofluoric acid catalyst. The resulting compounds possess a novel chemical structure which imparts highly advantageous properties thereto. Among these properties is resistance to isomerization or fragmentation of the alkane portion of the molecule. These new properties adapt the compounds for synthesis of valuable derivatives without deleterious decomposition or isomerization during the synthesis, and the derivatives, in turn, exhibit new and useful characteristics.

Figure I of the drawing shows a diagrammatic flowsheet of a process and apparatus for the production of the new compounds according to this invention. Figure II illustrates diagrammatically an alternative process and apparatus suitable for large-scale production.

An important feature which characterizes the novel compounds of this invention comprises the relationship between the number of carbon atoms in the alkane portion of the molecule on the one hand, and the degree and type of chain branching, on the other hand. The monoaryl-substituted alkanes here contemplated preferably should contain from twelve to fifteen carbon atoms in the alkane chain. As respects chain structure, the alkane skeleton should be substantially that of acyclic propylene polymers. In general, side chains of polypropylene $C_{12}$ to $C_{15}$ alkenes consist essentially of a single methyl group on alternate carbon atoms of the chain, and the total average number of methyl groups may be, for example, from $$\frac{n}{3} - 1 \text{ to } \frac{n}{3} + 1$$

where $n$ is the total average number of alkyl carbon atoms in the alkane portion of the molecule.

An exemplary schematic formula believed to represent the type compounds of this invention is:

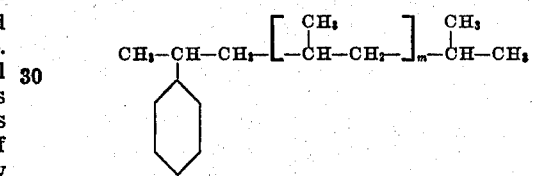

where $m$ is a small whole number from 2 to 3 inclusive. The invention is not limited to any particular position of the aryl group on the alkane chain, and the aromatic nucleus may be directly attached to the alkane near one end of the chain or near the middle thereof.

Table 1 lists a number of compounds illustrative of the foregoing structures.

Table 1

| Compound | Number of Methyl Groups |
|---|---|
| CH$_3$—CH—CH$_2$—CH(CH$_3$)—CH$_2$—CH(CH$_3$)—CH$_2$—CH(CH$_3$)—CH$_2$—CH—CH$_3$ (with phenyl substituent) | 5 |
| CH$_3$—CH—CH$_2$—CH(CH$_3$)—CH$_2$—CH(CH$_3$)—CH$_2$—CH(CH$_3$)—CH$_2$—CH(CH$_3$)—CH—CH$_3$ (with phenyl substituent) | 6 |
| CH$_3$—CH—CH$_2$—CH(CH$_3$)—CH$_2$—CH(CH$_3$)—CH$_2$—CH$_2$—CH$_3$ (with phenyl substituent) | 4 |
| CH$_3$—CH—CH$_2$—CH(CH$_3$)—CH$_2$—CH(CH$_3$)—CH$_2$—CH(CH$_3$)—CH$_2$—CH$_2$—CH$_3$ (with phenyl substituent) | 5 |

The new aryl alkanes preferably are synthesized by condensation of an aromatic compound with the alkene in the presence of a hydrofluoric acid catalyst. The condensation reaction may be written:

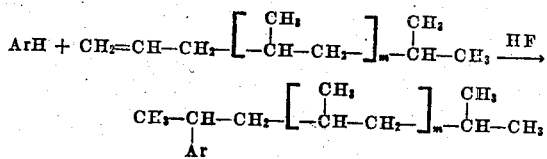

where Ar represents an aromatic nucleus. Anhydrous hydrofluoric acid is the preferred catalyst, and the condensation reaction may be carried out at relatively low temperature as by cooling with ice. Other catalysts such as BF$_3$, mixtures of BF$_3$ and HF, AlCl$_3$ or H$_2$SO$_4$ are operative but less desirable.

The structure of the alkene is of vital significance to best results in this synthesis, as well as to the production of compounds having the desired properties. It is known, for example, that when an alkene of the structure:

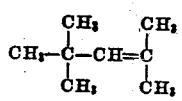

is condensed with benzene in the presence of hydrofluoric acid, the alkene or alkane breaks into C$_4$ fragments and these fragments react with the benzene nucleus. Similar fragmentation has been obtained in attempts to condense alkene structures such as in diamylenes with benzene, utilizing aluminum chloride as a catalyst. As heretofore stated, one of the important discoveries embraced by this invention involves avoidance, or at least substantial reduction, of fragmentation by preparation of aryl-alkanes from alkenes having the basic structure of polypropylene alkenes. Such alkenes and the corresponding monoaryl-substituted alkanes are resistant to fragmentation or isomerization by hydrofluoric acid and other strong reagents or catalysts.

Alkenes of the preferred structure can be obtained by polymerization of substantially pure propylene under suitable conditions to form the acyclic tetramer and pentamer fractions thereof in admixture with other polymers from which separation is effected. Mixtures of propylene with saturated low molecular weight hydrocarbons which do not enter the polymerization reaction may be used as a feed stock; for example, propylene containing propane, ethane, and methane. Further, a mixture of such hydrocarbons containing ethylene is advantageous since the ethylene may enter the polymerization reaction to a minor but sufficient extent to reduce the average number of side chain methyl groups by as much as from 1 to 2 in the average alkene molecule of from nine to eighteen carbon atoms. However, the propylene feed preferably should be substantially free of impurities such as isobutenes which introduce points of instability in the alkene molecule and render it more susceptible to fragmentation. Likewise, the amount of normal butene impurities should be kept at a minimum to obtain best results since it has been found that even the normal butenes yield alkenes having low resistance to fragmentation relative to propylene.

A suitable feed stock for polymerization is pure propylene, or a mixture thereof, with ethylene and saturated hydrocarbons in proportions such as the following:

| Component | Per Cent by Volume (Vapor) |
| --- | --- |
| Methane and hydrogen | 12.2 |
| Ethene | 5.5 |
| Ethane | 29.1 |
| Propene | 21.6 |
| Propane | 30.5 |
| Isobutane | 0.6 |
| Butene (n) | 0.5 |
| Total | 100.0 |

One method for polymerizing the propylene feed comprises contacting the hydrocarbon with a phosphoric acid catalyst; for example, with a catalyst formed by saturating a support such as kieselguhr or activated charcoal with 75% aqueous orthophosphoric acid. Catalyst temperature may vary from 300° F. to 500° F. and feed rate from 0.25 to 1.15 volumes of gas per volume of catalyst per hour. Pressure may be atmospheric, although higher pressures are preferred; for example, 200 to 600 pounds per square inch. The resulting polymer product is a mixture of alkenes from which the hydrofluoric acid-stable acyclic alkenes utilized in the present invention are obtained by close fractional distillation.

The polypropylenes should boil within the range of from about 300° F. to 600° F. and more desirably within the range of from about 340° F. to 520° F. A preferred propylene tetramer fraction boils within the range of from about 340° F. to 420° F., and the preferred propylene pentamer fraction boils within the range from about 420° F. to about 510° F. A blend consisting of from approximately 60% to 80% by volume of the foregoing tetramer mixture with approximately 40% to 20% of the above pentamer mixture, upon conversion to the corresponding monophenyl alkanes and sulfonation, yields a sodium salt which is more effective as a detergent than either the pentamer or tetramer fractions alone. It has also been discovered that a mixture of polypropylenes having an initial boiling point of 365° F. to 370° F. and an end point of from 465° F. to 475° F., upon conversion to the corresponding phenyl alkane and sulfonation, yields a superior detergent. The foregoing boiling ranges are determined by an ASTM-D86 standard distillation.

Unsaturation of the propylene polymer fractions should correspond substantially to that of the monoolefins. Inspections of exemplary propylene tetramer and pentamer fractions are as follows:

Example 1
Tetramer

| Test | Data |
| --- | --- |
| Boiling Range (760 mm.) ° F. | 340–420 |
| Gravity (A. P. I.) degrees | 51.6 |
| Index of Refraction $n_D$ | 1.4370 |
| Viscosity at 100° F. Centistokes | 1.228 |
| Viscosity at 210° F. do | 0.644 |
| Bromine Number | 92 |

Example 2
Pentamer

| Test | Data |
| --- | --- |
| Boiling Range (760 mm.) ° F. | 420–510 |
| Gravity (A. P. I.) degrees | 45.3 |
| Index of Refraction $n_D$ | 1.4502 |
| Viscosity at 100° F. Centistokes | 2.33 |
| Viscosity at 210° F. do | 0.974 |

Distillation of the pentamer in a Stedman still gave the following results:

| Parts by Volume (liquid) Overhead | Vapor Temp., °F. | Pressure, mm. Hg. | Equivalent Vapor Temp., °F. at 760 mm. |
| --- | --- | --- | --- |
| 0 | 209 | 23 | 400 |
| 10 | 218 | 23 | 410 |
| 70 | 222 | 19 | 428 |
| 130 | 230 | 18 | 438 |
| 190 | 237 | 17 | 450 |
| 320 | 257 | 15 | 480 |
| 350 | 266 | 15 | 491 |
| 380 | 280 | 15 | 510 |

Alkenes of the foregoing structure are condensed with an aromatic compound in the presence of a hydrofluoric acid catalyst, as previously stated, to form the monoaryl-substituted alkanes of this invention. Monoaryl alkanes containing an aromatic radical derived from hydrocarbons of the benzene series are preferred. Examples of suitable aromatic compounds comprise the hydrocarbons—benzene, toluene, xylene.

A hydrofluoric acid catalyst has been found highly advantageous for effecting the foregoing condensation despite the fact that prior literature and experience indicates that this catalyst tends to decompose branched-chain alkenes into shorter chained fragments in the condensation reaction. When the alkene is of the structure herein defined, the condensation reaction goes smoothly with minimum formation of side reaction products characteristic of chain fragmentation.

The condensation reaction is exothermic and the temperature desirably is maintained between from about 20° F. to 50° F. by indirect cooling of a closed reaction chamber. Amounts of hydrofluoric acid such as 200 to 800 mol per cent of the olefin are suitable. Since the alkene is relatively expensive, an excess of the aromatic compound is usually adopted to effect more complete conversion of the alkene to aryl alkane and to minimize condensation of two or more alkene molecules with the same aromatic nucleus. Upon completion of the reaction, the hydrofluoric acid catalyst is driven off by vaporization and the remaining traces thereof may be removed by washing with aqueous alkali.

Distillation of the remaining reaction product to first remove excess benzene and then to separate the monoaryl-substituted alkane as overhead yields the desired compounds. Monoaryl alkanes of this invention boil within the range of from about 475° F. to about 650° F., and more desirably within the range of from about 500° F. to about 625° F. A preferred fraction for conversion to a sulfonate detergent distills within the range of from about 500° F. to about 600° F. The foregoing boiling ranges are determined by a standard ASTM–D86 distillation.

Except in those cases where the original alkene is contaminated with impurities, it has been found that the aryl alkane overhead is substantially free of objectional color bodies, yields little or no unsulfonatable residue, and contains substantially the same number of carbon atoms in the alkane portion of the molecule as were present in the original alkene. The relative purity and stability of the product of the reaction makes possible the production of sulfonates and other derivatives without the necessity for decolorizing treatments with adsorbents or stabilization by sulfuric acid treatment or the like, which heretofore has complicated the production of such derivatives. However, it should be understood that the invention is not to be avoided merely by using slightly contaminated alkenes, which contamination may be the source of some color bodies or other side reaction products, since even in this event the quantities of these undesirable materials are substantially reduced as compared with that obtained in the prior methods of condensing branched-chain alkenes with aromatic compounds.

In practicing the invention, according to Figure I of the drawing, an excess of benzene and a suitable polypropylene fraction as herein disclosed, are fed by way of valve-controlled lines 10 and 11, respectively, to an alumina drier 12 in order to remove small quantities of water normally present in such feed stocks and to avoid contamination of the hydrofluoric acid catalyst with such water. The dehydrated feed mixture then flows by way of line 13 to a sealed contactor 14 provided with a cooling jacket 16. As here shown, contactor 14 is of the induction type and is provided with a sealed rotary agitator 17 provided at its upper end with an armature 18 which is impelled by a rotating magnetic field generated by field coil 19 outside the sealed container.

Anhydrous hydrofluoric acid is introduced into contactor 14 by way of feed line 21 and intimately contacted with the hydrocarbon reactants by the vigorous action of agitator 17. The hydrofluoric acid catalyzes the condensation of the propylene with the benzene feed to form monoaryl alkanes, as previously described. Temperature is controlled and heat of the exothermic reaction removed by circulating any suitable refrigerant through cooling jacket 16 as indicated by inlet and outlet lines 22 and 23, respectively.

As the reaction mixture flows upwardly through contactor 14 it overflows by way of discharge line 24 to settler 25 where the mixture separates into an upper oil phase and a lower hydrofluoric acid phase. The latter phase is withdrawn from the bottom of settler 25 by way of discharge line 26 and recycled to contactor 14 as indicated.

Outlet conduit 27 conveys the upper oily layer comprising excess benzene and condensation reaction products saturated with hydrofluoric acid to a caustic washing tower 28 where the hydrofluoric acid is neutralized and for the most part removed as a water-soluble sodium salt. Aqueous sodium hydroxide solution may be circulated through the washer by means of inlet and outlet lines 29 and 31, respectively.

The washed hydrocarbon mixture is withdrawn from the top of caustic washer 28 by means of outlet line 32 and introduced into a benzene stripper 33 where the excess benzene is removed as a vapor-phase overhead through line 34. The remaining higher-boiling hydrocarbons flow downwardly through stripper column 33 and pass from the bottom thereof by way of line 36 to fractionating column 37. This fractionator reduces the hydrocarbon mixture to the desired initial boiling point by removal of any lower-boiling hydrocarbons which may be present either because of incomplete reaction in contactor 14 or because of formation during such reaction. These lower-boiling hydrocarbons are removed as a vapor-phase overhead through line 38. The remaining higher-boiling hydrocarbons pass downwardly through fractionator 37 and are discharged by way of line 39 into fractionator 41.

This feed to fractionator 41 should have an initial boiling point of at least about 475° F. and more desirably about 500° F., as previously disclosed. When the aryl alkanes are to be converted to a sulfonate detergent, the initial boiling point preferably is about 500° F.

Monoaryl alkanes having the selected initial boiling point are separated as a vapor-phase overhead in fractionator 41 and the end point thereof may be varied from about 600° F. to about 650° F., as previously explained. The aryl alkane product is withdrawn from the top of fractionator 41 by means of outlet conduit 42 and is condensed and passed to storage. The higher-boiling hydrocarbons are discharged from the bottom of fractionator 41 by way of line 43.

In general, it will be found preferable to operate fractionator 41 under vacuum in order to avoid degradation of the product. This is also true, but to a lesser extent, of fractionator 37.

In Figure II of the drawing, the polypropylene is fed to the system by way of inlet line 50 and the excess benzene by inlet line 51, and the mixed feed is first dehydrated in fractionating column 52. This fractionating column is operated under total reflux. In this operation water together with a fraction of the hydrocarbons is vaporized overhead, passes through line 53 to condenser 54 and the condensate collected and allowed to stratify in condensate drum 56. The lower water layer is removed by line 57 and the hydrocarbon layer returned to fractionating column 52 by way of reflux line 58. The dehydrated feed passes from the bottom of fractionator 52 through line 59 and cooler 60 to reactor 61. Condensation of the polypropylene with the benzene is effected by hydrofluoric acid catalysis in reactor 61, and the temperature is controlled by indirect heat exchange with any suitable refrigerant introduced through cooling tube 62 as indicated.

Inasmuch as the hydrofluoric acid catalyst, which may be introduced through feed line 65, is not miscible with the hydrocarbon reactants, it is important that intimate contact between the hydrocarbon and hydrofluoric acid phases be effected by vigorous agitation. As here shown, an agitator 63 is provided and is driven by motor 64 connected thereto by a shaft 66 passing through the bottom of reactor 61. In the construction of this agitator, it has been found advantageous not only to provide a hydrofluoric acid-resistant bearing and packing for shaft 66 but also to flush this bearing and packing with fresh benzene admitted by way of valve-controlled line 67 whereby minimum exposure to the action of hydrofluoric acid is obtained.

After the hydrofluoric acid catalyzed condensation has been effected in reactor 61, the reaction mixture is passed through outlet conduit 68 to settler 69 where a lower hydrofluoric acid phase and an upper hydrocarbon phase are formed. The lower acid phase is withdrawn from the bottom of settler 69 through line 71 and may be recycled to the reactor by way of valve-controlled line 72 or passed to the hydrofluoric acid purification unit hereafter described by way of valve-controlled line 73.

The oil phase in the upper portion of settler 69 contains the excess benzene as well as some hydrofluoric acid, and the condensation reaction products. This oil phase is continuously withdrawn and flows through line 74 and heater 76 to benzene stripping column 77 where benzene and hydrofluoric acid are vaporized as overhead and are conducted through line 78 and condenser 79 to condensate drum 81. In order to improve the separation of benzene, a portion of the hydrocarbon distillate collected in condensate drum 81 may be returned to stripper 77 by way of reflux line 82. The benzene-hydrofluoric acid mixture is withdrawn from condensate drum 81 through line 83 and may be processed as hereafter described in more detail in one of three ways, namely by passing the mixture through valve-controlled line 84 to the hydrofluoric acid recovery system, by recycling directly to reactor 61 through valve-controlled return line 86, or by feeding the benzene-hydrofluoric acid mixture through valve-controlled line 87 to a suitable fractionator for separating the two components.

Returning now to benzene stripper 77, the hydrocarbon reaction mixture stripped of its benzene and most of the hydrofluoric acid contained therein flows from the bottom of said stripper through outlet line 88 to a lime or bauxite packed treater 89. In order to facilitate continuous operation, two or more of these treating chambers may be connected in parallel so that one may be replenished while the other is on stream. The lime or bauxite in the treater 89 serves to remove a major portion of residual hydrofluoric acid and may partially decompose or remove any fluorides formed in previous stages of the process. The treated hydrocarbon mixture flows from the bottom of treater 89 through line 91 to washer 92 where final traces of organic fluorides are decomposed or extracted.

Washer 92 contains a lower aqueous caustic layer 93 and an upper water layer 94. The interface between these two layers is indicated by dotted line 96. Desirably, aqueous caustic is introduced by pump 97 at inlet 98 in the upper zone of the aqueous alkali layer and circulated downwardly to outlet line 99. Fresh caustic may be introduced and spent caustic discharged by suitable connections not shown. Water is likewise preferably circulated from upper inlet 101 to lower outlet 102 in order to provide a countercurrent washing action for removing any entrained caustic. Thus, the hydrocarbon feed introduced by line 91 flows upwardly through washer 92 to outlet conduit 103 and fractionator 104.

Lower-boiling hydrocarbons are separated and the reaction mixture reduced to the desired initial boiling point by vaporization in fractionator 104. The vapor-phase hydrocarbons are taken off as overhead through line 106 and condenser 107 to condensate drum 108. Improved fractionation is obtained by returning a portion of the condensate through reflux line 109 to fractionator 104. Condensed hydrocarbons are removed from the condensate drum by way of line 111. The remaining hydrocarbons, consisting essentially of monoaryl alkanes and having an initial boiling point within the range previously described, are passed from the bottom of fractionator 104 through line 112 to fractionator 113.

Monoaryl alkane product is distilled overhead from fractionator 113 through line 114 and condenser 116 to condensate drum 117. Product is withdrawn to storage by way of line 118 and should have an end point as previously described. Bottoms from fractionator 113 are discharged through line 119.

In the continuous operation of this system, the hydrofluoric acid becomes contaminated with water and acid oil until its efficacy as a catalyst is substantially diminished despite the fact that the hydrocarbon feed is carefully dehydrated as described. Thus, the hydrofluoric acid layer separated in settler 69 becomes an aqueous mixture which must either be discarded or be suitably treated to recover and purify the same. In a preferred operation, this acid layer or a portion thereof is either intermittently or continuously conducted to a purification unit by way of valve-controlled line 73.

Purification and recovery of the contaminated hydrofluoric acid presents a problem by reason of constant-boiling mixtures which the acid forms with its contaminants. In order to facilitate recovery and purification, fresh benzene is introduced by way of valve-controlled line 121 into the aqueous mixture of line 73 and passed through preheater 122 to fractionating column 123. In this column benzene acts as a stripping agent and carries hydrofluoric acid as vapor-phase overhead through condenser 124 to condensate drum 126. A portion of the condensate is returned as reflux through line 127 to fractionating column 123. The remaining hydrofluoric acid-benzene condensate is recycled by way of line 128 to reactor 61. Bottoms from fractionator 123 comprise a constant-boiling mixture of hydrofluoric acid and water together with acid oil contaminant and are withdrawn through discharge line 129. Fractionating column 123 thus effects a split between benzene and hydrofluoric acid on the one hand and a constant-boiling aqueous hydrofluoric acid mixture.

Instead of or in addition to the fresh benzene fed to fractionator 123 by way of line 121, the benzene-hydrofluoric acid mixture from condensate drum 81 may be introduced by way of valve-controlled line 84 into HF recovery line 73 as previously described. The relatively large excess of benzene in the mixture from condensate drum 81 serves as a stripping agent and permits economy in the use of fresh benzene.

Alternatively, the benzene-hydrofluoric acid mixture from condensate drum 81 may be passed through valve-controlled line 87 to fractionator 131 where fractional distillation effects separation of the benzene and the hydrofluoric acid. The vapor-phase hydrofluoric acid passes overhead through line 132 and condenser 133 to condensate drum 134. The fractionator may be operated under reflux by returning a portion of the condensate through reflux line 136. Hydrofluoric acid from condensate drum 134 is recycled to reactor 61 by way of line 137 and return line 86. Benzene from the bottom of fractionator 131 is recycled to reactor 61 through line 138.

In order to guide those skilled in the art in the chemistry of the process and of the compositions of this invention, the following specific examples are given:

EXAMPLE 3

100 milliliters of benzene (87 grams) and 270 grams of anhydrous hydrofluoric acid were placed in a stainless steel, closed reaction flask equipped with a metal stirrer and immersed in an ice bath. A feed stock consisting of 227 grams of an acyclic propylene tetramer and 527 grams of benzene was added over a period of 15 minutes while stirring continuously. The reaction mixture was stirred for an additional four hours at ice bath temperature and then neutralized with an aqueous potassium hydroxide solution to remove the hydrofluoric acid catalyst. The aqueous layer was separated from the crude reaction product and discarded. After drying over sodium bicarbonate and filtering, 790.5 grams of crude reaction product was obtained (yield = 94%). This crude reaction product was distilled to obtain the monophenyl alkane fraction as follows:

| Fraction | Distillation Range at 760 mm. (Vapor line Temp.) °F. | Volume Per Cent |
|---|---|---|
| Benzene fraction | 175–450 | 61 |
| Monophenyl dodecane fraction | 450–623 | 33 |
| Bottoms | 623+ | 6 |

In separating the monophenyl alkane, the foregoing distillation was actually carried out at 3 mm. pressure. It will be seen that the yield of monophenyl alkane was 80.8% of theoretical. The bottoms fraction consisted of phenyl alkanes in which two of the original alkenes condensed with a single aromatic nucleus and about 16% of the original alkene went into the production of these compounds. Loss to benzene overhead was only about 3.2%.

Inspections of the monophenyl alkane were:

| | |
|---|---|
| Gravity (A.P.I.) | 30.9 |
| Refractive index $n_D^{20}$ | 1.4884 |
| Specific dispersion | 128 |
| Viscosity at 100° F. centistokes | 6.60 |
| Viscosity at 210° F. do | 1.89 |

This product was essentially a mixture of isomeric monophenyl dodecanes believed to contain approximately five methyl groups in the alkane portion of the molecule.

The propylene tetramer fraction utilized in the preparation of the foregoing compound had an A.P.I. gravity of 51.5, a bromine number of 85, and a boiling range of 325° F. to 400° F. Distillation of this tetramer revealed the following distribution of isomeric dodecenes according to the boiling range:

| Per Cent Over | Temperature, °F. (corrected to 760 mm.) |
|---|---|
| Start | 325 |
| 5 | 339 |
| 10 | 342 |
| 20 | 344 |
| 30 | 346 |
| 40 | 349 |
| 50 | 354 |
| 60 | 359 |
| 70 | 364 |
| 80 | 368 |
| 90 | 380 |
| 95 | 390 |
| 100 | 400 |

EXAMPLE 4

825 grams of benzene and 266 grams of anhydrous hydrofluoric acid were placed in a stainless steel flask equipped with a metal stirrer and cooled by an ice water bath as in Example 3. A feed stock consisting of 861 grams of propylene tetramer fraction and 1106 grams of benzene was added over a period of 66 minutes, and the reaction allowed to proceed for an additional 60 minutes with stirring at ice bath temperature. The reaction mixture was diluted with ice and neutralized with aqueous potassium hydroxide solution, after which the aqueous layer was drawn off and discarded. The crude reaction mixture was next washed with distilled water, dried by shaking with sodium bicarbonate and filtered to obtain 2700 grams (97%) of product dissolved in excess benzene. Distillation of this mixture to obtain the monophenyl alkane gave the following yields:

| Fraction | Volume, Per Cent | Weight, gm. | Boiling Range, °F. at 760 mm. |
|---|---|---|---|
| Benzene Fraction | 57.5 | 1557 | 175–455 |
| Monophenyl dodecanes | 38.6 | 1000 | 455–625 (92% from 510–550) |
| Bottoms | 3.9 | 143 | 625+ |

The monophenyl dodecane fraction was 80.5% of the total alkylate after removal of excess benzene; 11.5% of the alkylate was lost to overhead benzene cut and about 8.0% was lost to distillation bottoms. Conversion of olefin to alkylate was essentially 100%.

Inspections on the monophenyl dodecane fraction were:

| | |
|---|---|
| Gravity (A.P.I.) | 31.4 |
| Specific dispersion | 131 |
| Refractive index $n_D^{20}$ | 1.4874 |

The propylene tetramer fraction utilized in the preparation of the foregoing compound was characterized by the following inspections:

| | |
|---|---|
| Boiling range at 760 mm. °F. | 340–420 |
| Gravity (A.P.I.) | 51.6 |
| Refractive index $n_D^{20}$ | 1.4370 |
| Viscosity at 100° F. centistokes | 1.228 |
| Viscosity at 210° F. do | .644 |
| Bromine number | 92 |

EXAMPLE 5

The monophenyl pentadecane fraction was prepared by condensing the propylene pentamer of Example 2 with benzene in the presence of anhydrous hydrofluoric acid as a catalyst by a procedure substantially as described in Examples 3 and 4 above. The data on two such preparations may be summarized as follows:

| | Run A | Run B |
|---|---|---|
| *Pentadecene Inspections* | | |
| Boiling Range (760 mm.) | 420–510° F. | 420–520° F. |
| Gravity, °A. P. I. | 45.3 | 44.7. |
| Bromine Number | 95. | 102. |
| *Reaction Conditions* | | |
| Mol. Ratio (pentadecene: benzene: HF) | 1:5.3:2.5 | 1:5:4. |
| Temperature | Ice Bath | Ice Bath. |
| Pressure | Atmospheric | Atmospheric. |
| Vessel | Stainless steel | Stainless steel. |
| Addition time | 51 minutes | 60 minutes. |
| Reaction time | 45 minutes | 3.75 hours. |

|  | Run A | Run B |
|---|---|---|
| *Yield Data* |  |  |
| Reactants used— |  |  |
| Pentadecene | 627 gm | 738 gm. |
| Benzene | 1,246 gm | 1,640 gm. |
| Crude yield after wash | 1,777 gm | 2,270 gm. |
| Crude yield, per cent | 95 | 95.5. |
| *Distillation* |  |  |
| Charge | 1,742 gm | 2,270 gm. |

|  | Vol., Per Cent | Wt., gm. | Vol., Per Cent | Wt., gm. |
|---|---|---|---|---|
| Cuts: |  |  |  |  |
| No. 1 (benzene) | 75 | 1,302 | 69 | 1,567 |
| No. 3 (monophenyl pentadecanes) | 18 | 320 | 25 | 568 |
| No. 4 (bottoms) | 7 | 120 | 6 | 135 |
| *Boiling Ranges at 760 mm.* |  |  |  |  |
| No. 3 (monophenyl pentadecanes) | 515–664° F. (63% from 580–630). |  | 520–680° F. (82% from 580–630). |  |
| Per Cent Theoretical Yield | 37.2 |  | 55.6. |  |
| Per Cent of Pentadecene to Bottoms | 16.1 |  | 14.3. |  |
| *Inspections on Monophenyl pentadecanes* |  |  |  |  |
| Gravity, ° A. P. I. | 31.9 |  | 30.6. |  |
| Specific dispersion | 129 |  | 128. |  |
| Refractive Index $n_D^{20}$ | 1.4850 |  | 1.4886. |  |

Example 6

In this example, on which the following data are given, a process and apparatus substantially identical with that described in Figure I of the drawing were utilized:

Operating conditions (continuous process):
　Aromatic feed: Benzene
　Propylene polymer feed:

Initial boiling point (ASTM) °F__ 362
　　End point (ASTM) °F__ 464
　　Gravity (A. P. I.) __ 47.1
　　Bromine number __ 103.1

Feed Mixture:
　10:1 benzene to polymer mol ratio
Reaction conditions:
　Temperature: 50° F.
　Stirrer speed: 2250 R. P. M.
　Hydrocarbon feed rate: 2856 vol./hr.
　Olefin vol. per vol. of catalyst per hour: 0.55
　Catalyst replacement rate: 0.26 vol. of 100% HF per vol. of polymer to maintain 79% HF
Crude reaction product:
　Bromine number: 0.9
　Percent F: nil to 0.1
Crude phenyl alkanes (ASTM distillation):
　Vol. percent lighter than 520° F.: 7.5
　Vol. percent boiling 520° F. to 600° F.: 86.0
　Vol. percent bottoms (boiling above about 600° F.): 6.5
Yields:
　Vol. crude phenyl alkanes per vol. of polymer __ 1.19
　Vol. benzene consumed per vol. polymer fed __ 0.354
　Vol. polymer loss to acid oil per vol. polymer fed __ 0.08
　Vol. benzene loss to acid oil per vol. polymer fed __ 0.015
　Vol. crude phenyl alkanes per vol. benzene used __ 3.34
　Vol. finished phenyl alkanes per vol. polymer fed __ 1.02

Example 7

Toluene may be substituted for the benzene in the process described in Examples 3 to 6, inclusive, to obtain the monotolyl-substituted alkane. Likewise, xylene may be substituted for the benzene to obtain the corresponding xylyl derivatives.

The foregoing compounds and mixtures thereof are novel compositions of matter and possess a unique combination of properties. For example, the mixtures of monophenyl-substituted acyclic $C_{12}$ to $C_{15}$ propylene polymers are relatively easily converted to sulfonic acids without material decomposition of the side chains. The sulfonic acids so obtained and their salts exhibit remarkable freedom from unsulfonatable impurities and color bodies. The alkali metal salts of these acids possess high detergency and cleansing action in aqueous media.

These new and unpredictable characteristics are illustrated by comparison with phenyl alkanes derived by alkylation of benzene with mixed butene polymers in the $C_{12}$ to $C_{16}$ range. In comparative tests alkylation of benzene with $C_{12}$ olefins from mixed butenes (boiling range, 350° F. to 400° F., A. P. I. gravity, 45.2) yielded only 29% of alkylate having a molecular weight corresponding to that of the alkenes; approximately 48% of the olefin was lost to light alkylate by reason of fragmentation and about 23% was lost to distillation bottoms. Conversion of olefin to alkylate was about 86.3%. In contrast thereto, alkylation of benzene with a $C_{12}$ polypropylene (boiling range, 340° F. to 420° F., A. P. I. gravity, 41.6) gave an 80.5% yield of the corresponding monophenyl dodecanes with approximately 100% conversion. Subsequent sulfonation of the foregoing alkyl benzene from mixed butenes revealed 25.6% of unsulfonatable residue requiring purification for removal and only 74.4% of the alkyl benzene was convertible to the sulfonate. On the other hand, 97.2% of the monophenyl dodecane fraction from polypropylene was converted to the desired sulfonate and required no purification. Significant distinctions in the structure of the mixed butene alkylate and the monophenyl dodecanes from polypropylene is shown by the fact that in a detergency test at 0.2% concentration (60% sodium sulfate with 40% sodium sulfonate) under comparable conditions the polybutene benzene sulfonate gave a value of 1 as compared with a value of 46 for the sulfonated monophenyl dodecane fraction from polypropylene.

The compounds of this invention are useful for many purposes. The monophenyl-substituted polypropylenes possess utility as such and are water white to slightly yellow, oily but free-flowing liquids which are miscible in all proportions with mineral oil. These monophenyl alkanes are of outstanding utility when sulfonated to form the sulfonic acids, which acids, as well as the water-soluble salts thereof, are surface active and may be used as wetting agents or detergents.

The monophenyl alkanes of this invention may be converted to exo-sulfonyl chlorides which, in turn, may be converted to the corresponding exo-sulfonic acid and metal salts thereof. For example, the monophenyl-substituted propylene tetramer fraction may be treated, in the presence of light from a tungsten filament lamp, with sulfur dioxide and chlorine for a suitable period such as five to ten hours to obtain the exo-sulfonyl chloride. The reaction product is then converted to the exo-sodium sulfonate by hydrolysis and neutralization with ten normal sodium hydroxide. The resulting aqueous solution is diluted with water, extracted with benzene to remove unsulfonated hydrocarbon and obtain an aqueous solution of the desired salt which possesses surface active properties.

It should be observed that in the synthesis of aryl alkanes according to this invention, the phenyl type derivatives present a problem distinct from various other compounds such as the phenolic or naphthalene substituted alkane compounds. This problem arises by reason of the resistance of benzene to alkylation as compared to phenol or naphthalene. Benzene being much less reactive, i. e., more resistant to alkylation than phenol or naphthalene, thereby requires either such severe alkylation conditions or such a highly active catalyst that polymers like polyisobutylene are depolymerized. Whereas it has been claimed in the literature that di-isobutylene can be condensed with naphthalene to obtain a C8 side chain, for example, the same synthesis is inapplicable to preparation of the corresponding benzene derivative for the reason that depolymerization yields short chain (C4) products. As previously emphasized the alkenes and polypropylene alkanes of this invention possess a sufficiently high stability under alkylating conditions to afford an adequate and economical synthesis with benzene in addition to other aromatic compounds.

Although this invention has been exemplified with numerous examples, it is not intended that these should be limiting, since various modifications are embraced within the spirit of the invention as defined by the terms of the appended claims.

I claim:

1. Compounds of the type formula:

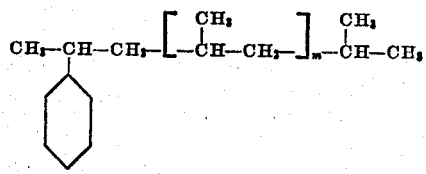

where $m$ is a small whole number from 2 to 3 inclusive, said compounds being convertible to sulfonic acids without material decomposition of the alkyl chain.

2. A mixture of monophenyl-substituted acyclic propylene polymers containing from twelve to fifteen carbon atoms in the polymer portion of the molecule, said substituted propylene polymers being convertible to sulfonic acids without material decomposition of the polymer chain.

3. Monophenyl-substituted acyclic propylene tetramers, said substituted tetramers being convertible to sulfonic acids without material decomposition of the tetramer chain.

4. Monophenyl-substituted acyclic propylene pentamers, said substituted propylene pentamers being convertible to sulfonic acids without material decomposition of the pentamer chain.

5. A monoaryl-substituted acyclic propylene tetramer fraction in which said aryl substituent is a hydrocarbon of the benzene series said aryl substituted tetramer fraction boiling below 625° F. and being convertible to sulfonic acids without material decomposition of the tetramer chain.

6. A mixture of monoaryl-substituted acyclic propylene polymers containing from 12 to 15 carbon atoms in the polymer portion of the molecule in which said aryl substituent is a hydrocarbon of the benzene series said aryl substituted propylene polymers boiling below 625° F. and being convertible to sulfonic acids without material decomposition of the polymer chains.

7. A mixture as defined in claim 6 wherein about 60 to 80% has a molecular weight equivalent to a tetramer fraction and about 40 to 20% a molecular weight equivalent to a pentamer fraction.

8. Monoaryl-substituted polymers consisting essentially of predominantly propylene polymers in which said aryl substituent is a mono-nuclear hydrocarbon of the benzene series and said polymer portion of the molecule has a molecular weight equivalent to from about 12 to about 15 carbon atoms said aryl-substituted polymers boiling below 625° F. and being convertible to sulfonic acids without material decomposition of the polymer chains.

9. Monoaryl-substituted polymers as defined in claim 8 wherein said aryl substituent is phenyl.

10. Monoaryl-substituted polymers as defined in claim 8 boiling between about 500 and 600° F.

11. Monoaryl-substituted polymers as defined in claim 8 wherein said polymers consist essentially of a fraction equivalent in molecular weight to a propylene tetramer fraction.

12. Monoaryl-substituted polymers as defined in claim 8 wherein said mono-nuclear hydrocarbon is toluene.

13. Mono-toluene-substituted acyclic propylene tetramers and being convertible to sulfonic acids without material decomposition of the tetramer chain.

14. A process of preparing monoaryl-substituted polymers having relatively high molecular weight and convertible to sulfonic acids without material decomposition of the polymer chains, which process comprises condensing predominantly propylene polymers having an average molecular weight equivalent to from about 12 to about 15 carbon atoms and boiling substantially within the range of from 340° F. to 520° F., with a mono-nuclear hydrocarbon of the benzene series in the presence of a condensation catalyst and an excess of said aromatic hydrocarbon to effect formation of said monoaryl-substituted polymers, recovering by distillation monoaryl-substituted polymer boiling within the range of from about 500° F. to about 600° F.

15. A process as defined in claim 14 wherein said condensation catalyst is hydrofluoric acid.

16. A process as defined in claim 14 wherein said mono-nuclear hydrocarbon is benzene.

17. A process as defined in claim 14 wherein said condensation catalyst is hydrofluoric acid and said aromatic hydrocarbon is benzene.

18. A process as defined in claim 14 wherein said mono-nuclear hydrocarbon is toluene.

19. A process as defined in claim 14 wherein said propylene is substantially free of iso-butene impurities.

20. A process as defined in claim 14 wherein said polymers consist essentially of from about 60 to 80% propylene tetramer and 40 to 20% propylene pentamers.

21. A process for preparing monoaryl-substituted $C_{12}$ to $C_{15}$ branched chain alkanes convertible to sulfonic acids without material decomposition of said chains which comprises condensing an aromatic hydrocarbon of the benzene series with an acyclic propylene polymer fraction boiling from about 365 to 370° F. to about 465° F. to 475° F., said polymer fraction having a molecular weight equivalent to from about 12 to 15 carbon atoms, catalyzing said condensation with an hydrofluoric acid catalyst, and recovering monoaryl-substituted $C_{12}$ to $C_{15}$ alkanes from the reaction mixture.

22. A process as defined in claim 21 wherein said aromatic hydrocarbon is benzene.

23. A process as defined in claim 21 wherein fresh catalyst fed to the condensation reaction is substantially anhydrous hydrogen fluoride.

ALLEN H. LEWIS.

REFERENCES CITED

The following references are of record in the file of this patent:

UNITED STATES PATENTS

| Number | Name | Date |
|---|---|---|
| 2,198,595 | Amos et al. | Apr. 30, 1940 |
| 2,213,477 | Steindorff et al. | Sept. 3, 1940 |
| 2,232,118 | Kyrides | Feb. 18, 1941 |
| 2,275,312 | Tinker et al. | Mar. 3, 1942 |
| 2,314,255 | Toone | Mar. 16, 1943 |
| 2,349,211 | Tulleners | May 16, 1944 |
| 2,404,340 | Zimmerman | July 16, 1946 |
| 2,430,673 | Gibson et al. | Nov. 11, 1947 |
| 2,437,356 | Hill | Mar. 9, 1948 |

OTHER REFERENCES

Simons et al.: Journ. of Amer. Chem. Soc., vol. 62, p. 451, Feb. 1940.

Halse: J. prakt. Chem. (2) 89, pages 451–465 (1914).